United States Patent [19]

Elrod et al.

[11] Patent Number: 4,751,534

[45] Date of Patent: Jun. 14, 1988

[54] PLANARIZED PRINTHEADS FOR ACOUSTIC PRINTING

[75] Inventors: Scott A. Elrod, Menlo Park; Butrus T. Khuri-Yakub, Palo Alto; Calvin F. Quate, Stanford, all of Calif.

[73] Assignee: Xerox Corporation, Stamford, Conn.

[21] Appl. No.: 944,145

[22] Filed: Dec. 19, 1986

[51] Int. Cl.[4] .............................................. G01D 15/16

[52] U.S. Cl. .................................. 346/140 R; 310/371

[58] Field of Search .................. 346/140, 75; 310/371, 310/335

[56] References Cited

U.S. PATENT DOCUMENTS

| | | | |
|---|---|---|---|
| 4,184,094 | 1/1980 | Kopel | 310/335 |
| 4,308,547 | 12/1981 | Lovelady et al. | 346/140 |
| 4,331,964 | 5/1982 | VanLokeren | 346/75 |
| 4,384,231 | 5/1983 | Ishikawa | 310/335 |
| 4,580,148 | 4/1986 | Domoto et al. | 346/140 |

FOREIGN PATENT DOCUMENTS 941213 1/1981 U.S.S.R. .

OTHER PUBLICATIONS

Petersen, Kurt E., "Silicon as a Mechanical Material", Proceedings of the IEEE, vol. 70, No. 5, May 1982, pp. 421–457.

Krause, K. A., "Focusing Ink Jet Head", IBM Technical Disclosure Bulletin , vol. 16, No. 4, Sep. 1973.

Wise, K. D. et al., "Fabrication of Hemispherical Structures Using Semiconductor Technology for Use in Thermonuclear Fusion Research", J. Vac. Sci. Technol., vol. 16, No. 3, May/Jun. 1979, pp. 936–939.

Quate, Calvin F., "The Acoustic Microscope", Scientific American, vol. 241, No. 4, Oct. 1979, pp. 62–70.

Quate, Calvin F., "Acoustic Microscopy", American Institute of Physics, Physics Today, Aug. 1985, pp. 34–42.

*Primary Examiner*—Joseph W. Hartary

[57] ABSTRACT

The output surface of an acoustic printhead having one or more concave acoustic beam forming devices for supplying focused acoustic beams to eject droplets of ink on demand from the surface of a pool of ink is planarized by filling those concave devices with a solid material having an acoustic impedance and an acoustic velocity which are intermediate the acoustic impedance and the acoustic velocity, respectively, of the ink and of the printhead. This not only facilitates the cleaning of the printhead, but also eliminates the edges upon which an optional ink transport or the like may tend to drag. The outer surface of the filler may be essentially flush with the face of the printhead, or the filler may overcoat the printhead.

11 Claims, 1 Drawing Sheet

PLANARIZED PRINTHEADS FOR ACOUSTIC PRINTING

FIELD OF THE INVENTION

This invention relates to acoustic printers and, more particularly, to planarized printheads for such printers.

BACKGROUND OF THE INVENTION

Acoustic printing is a potentially important direct marking technology. It still is in an early stage of development, but the available evidence indicates that it is likely to compare favorably with conventional ink jet systems for printing either on plain paper or on specialized recording media, while providing significant advantages of its own.

More particularly, acoustic printing does not require the use of nozzles with small ejection orifices which easily clog. Therefore, it not only has greater intrinsic reliability than ordinary drop on demand and continuous stream ink jet printing, but also is compatible with a wider variety of inks, including inks which have relatively high viscosities and inks which contain pigments and other particulate components. Furthermore, it has been found that acoustic printing provides relatively precise positioning of the individual printed picture elements ("pixels"), while permitting the size of those pixels to be adjusted during operation, either by controlling the size of the individual droplets of ink that are ejected or by regulating the number of ink droplets that are used to form the individual pixels of the printed image. See a copending and commonly assigned United States patent application of Elrod et al, which was filed Dec. 19, 1986 under Ser. No. 944,286 on "Variable Spot Size Acoustic Printing".

As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin,* Vol 16, No. 4, September 1973, pp. 1168–1170 described an ink jet in which an acoustic beam emanating from a concave surface and confined by a conical aperture was used to propel ink droplets out through a small ejection orifice. Lovelady et al. U.S. Pat. No. 4,308,547, which issued Dec. 29, 1981 on a "Liquid Droplet Emitter," showed that the small ejection orifice of the conventional ink jet is unnecessary. To that end, they provided spherical piezoelectric shells as transducers for supplying focused acoustic beams to eject droplets of ink from the free surface of a pool of ink. They also proposed acoustic horns driven by planar transducers to eject droplets of ink from an ink coated belt. Moreover, concurrently herewith, to increase the resolution which can be achieved and to provide a less cumbersome and lower cost technique for manufacturing arrays of relatively stable acoustic droplet ejectors, a copending and commonly assigned United States patent application of Elrod et al, which was filed Dec. 19, 1986 under Ser. No. 944,698 on "Acoustic Lens Arrays for Ink Printing" is introducing acoustic lenses for performing the beam focusing function, Also see another copending and commonly assigned United States patent application of Elrod et al, which was filed Dec. 19, 1986 under Ser. No. 944,145 on "Microlenses for Acoustic Printing".

The shell-like piezoelectric transducers and acoustic focusing lenses which have been developed for acoustic printing have concave beam forming surfaces. In practice, these beam forming surfaces typically have an essentially constant radius of curvature, regardless of whether they are spherical or cylindrical, because they are designed to cause the acoustic beams which they launch to come to a sharp focus at or near the free surface of the ink. A diffraction limited focus is the usual design goal for an acoustic lens, while an unaberrated focus is the usual design goal for a shell-like, self-focusing transducer. Unfortunately, however, the concavity of the beam forming surfaces of these devices causes them to collect and retain particulates which precipitate out of the ink or otherwise deposit on them. These deposits can cause unwanted defocusing of the acoustic beams, especially if they are permitted to accumulate over an extended period of time.

SUMMARY OF THE INVENTION

In accordance with this invention, the output surface of an acoustic printhead having one or more concave acoustic beam forming devices for supplying focused acoustic beams to eject droplets of ink on demand from the surface of a pool of ink is planarized by filling those concave devices with a solid material having an acoustic impedance and an acoustic velocity which are intermediate between the acoustic impedance and the acoustic velocity, respectively, of the ink and of the printhead. This not only facilitates the cleaning of the printhead, but also eliminates the edges upon which an optional ink transport or the like may tend to drag. The outer surface of the filler may be essentially flush with the face of the printhead, or the filler may overcoat the printhead.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
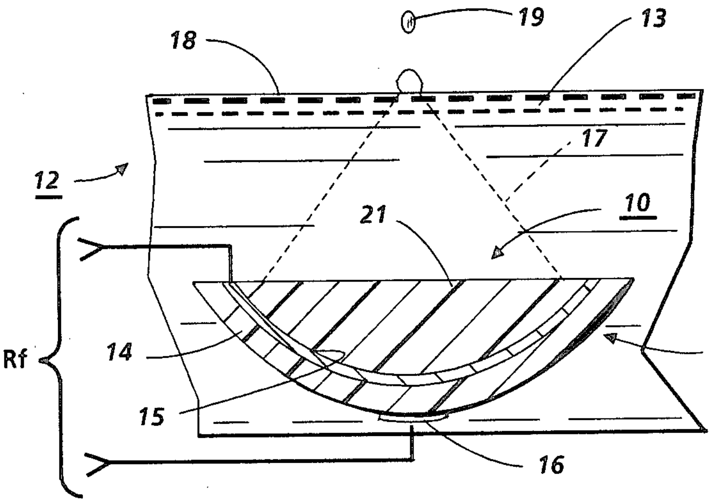
FIG. 1 is a sectional view of an acoustic printhead comprising a concave piezoelectric transducer which has been planarized in accordance with the present invention.

Turning now to the drawings, and at this point especially to FIG. 1, there is an acoustic printhead 10 (shown only in relevant part) having a simple shell-like, self-focusing piezoelectric transducer 11 for launching a converging acoustic beam into a pool 12 of ink 13. As shown, the transducer 11 comprises a spherical piezoelectric element 14 which is sandwiched between a pair of electrodes 15 and 16, so the piezoelectric element 14 is excited into a thickness mode oscillation when a rf voltage is applied across the electrodes 15 and 16. The oscillation of the piezoelectric element 14 generates a converging acoustic beam 17, and the radius of curvature of the piezoelectric element 14 is selected to cause the acoustic beam 17 to come to focus approximately at the free surface 18 of the pool 12.

To eject individual droplets 19 of ink from the pool 12 on demand, the rf excitation of the piezoelectric element 14 is modulated (by means not shown), thereby causing the radiation pressure which the focused acoustic beam 17 exerts against the surface 18 of the pool to swing above and below a predetermined droplet ejection threshold level as a function of the demand. For example, the rf voltage applied to the piezoelectric element 14 may be amplitude, frequency, or duration modulated (by means not shown) to control the droplet ejection process. While only a single transducer 11 is illustrated, it will be apparent that a linear or two dimensional array of transducers may be employed for printing. Furthermore, it will be understood that the piezoelectric element 14 may be cylindrical if it is desired to print elongated stripes, such as for a bar code.

In accordance with the present invention, to planarize the printhead 10, the concave surface of the transducer 11 (i.e., the outer face of its piezoelectric element 14) is filled with a homogeneous solid material 21 having an acoustic impedance and an acoustic velocity selected to be intermediate the acoustic impedance and acoustic velocity, respectively, of the ink 13 and of the piezoelectric element 14. Typically, the ink 13 has an acoustic impedance on the order of about $1.5\times10^6$ kg/mtr$^2$ sec and an acoustic velocity in the range of roughly 1–2 km/sec. Accordingly, the filler material 21 suitably is a polymer, such as a polyimide or a similar epoxy resin, which is applied to the transducer 11 in a liquid state and allowed to cure in situ while the transducer 11 is maintained in a face up, vertical orientation. This allows the filler 21 to initially flow sufficiently to avoid any significant internal voids and to cause it free outer surface to flatten under the influence of gravity, while ensuring that the filler 21 firmly bonds itself to the transducer 11 once it has cured. The outer surface of the filler 21 may be essentially flush with the face of the printhead 10 (FIG. 1), or the filler 21 may form a thin overcoating on the printhead 10 (see FIG. 3). As a practical matter, there may be some reflection and refraction of the acoustic beam 17 at the interface between the ink 13 and filler 21 because of minor differences between their acoustic impedances and velocities, but those factors can be taken into account as matters of routine design.

Figure 2:
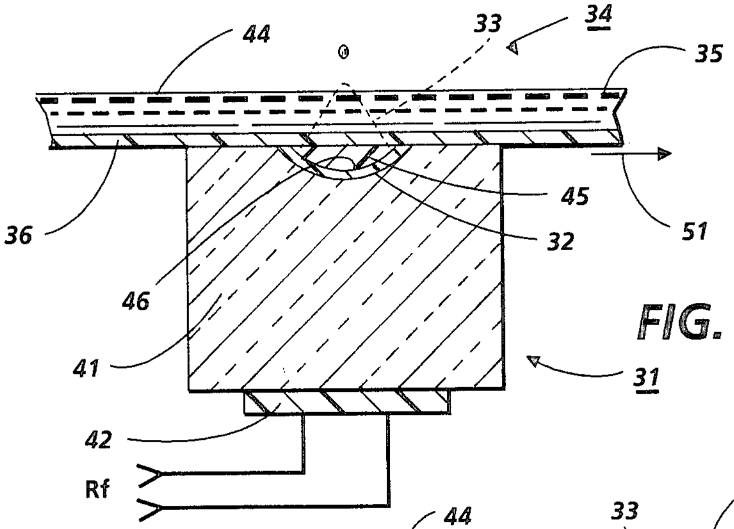
FIG. 2 a sectional view of an acoustic printhead comprising an acoustic lens which also has been planarized in accordance with this invention.
Figure 3:
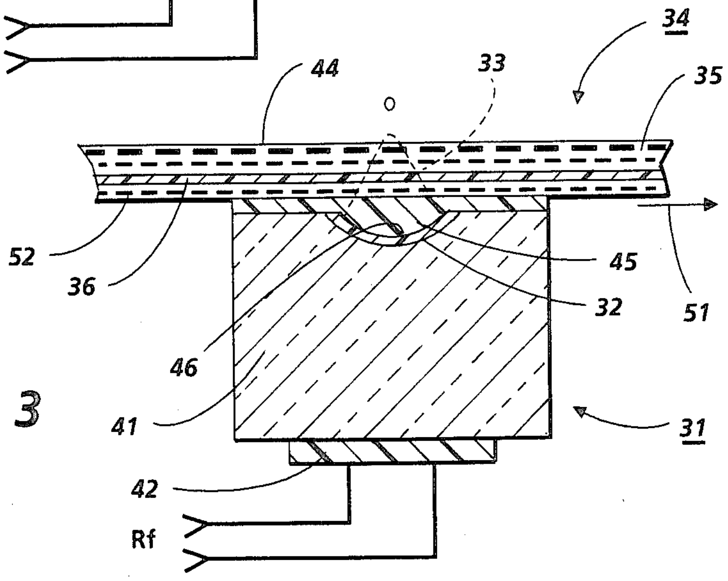
FIG. 3 is a sectional view of an alternative implementation of the invention in which the planarizing filler overcoats the printhead.

Referring to FIGS. 2 and 3, it will be seen that this invention also may be utilized for planarizing a printhead 31 having one or more acoustic lenses 32 for launching a corresponding number of converging acoustic beams 33 into a pool 34 of ink 35. More particularly, in keeping with the teachings of the aforementioned Elrod et al application on "Acoustic Lens Arrays for Ink Printing", each of the lenses 32 is defined by a small spherical depression or indentation which is formed in the upper surface of a solid substrate 41 (i.e., the output surface of the substrate 41). The substrate 41, in turn, is composed of a material, such as silicon, silicon nitride, silicon carbide, alumina, sapphire, fused quartz, and certain glasses, having an acoustic velocity which is much higher than the acoustic velocity of the ink 35. Furthermore, to illuminate the lens 32, a piezoelectric transducer 42 is deposited on or otherwise intimately mechanically coupled to the opposite or lower surface of the substrate 41, and a rf drive voltage (supplied by means not shown) is applied to the transducer 42 during operation to excite it into oscillation.

The oscillation of the transducer 42 generates an acoustic wave which propagates through the substrate 41 at a relatively high velocity until it strikes the lens 32. The wave then emerges into a medium having a much lower acoustic velocity, so the spherical shape of the lens 32 imparts a spherical wavefront to it, thereby forming the acoustic beam 33. Preferably, a sufficiently high refractive index ratio is maintained across the lens 32 to cause it to bring the beam 33 to an essentially diffraction limited focus on or near the free surface 44 of the pool of ink 35. In a typical case the focal length of the lens 32 may be approximately equal to its aperture ($F\#\approx1$). As before, the rf voltage applied to the transducer 42 may be amplitude, frequency, or duration modulated to control the droplet ejection process as required for drop on demand printing.

To carry out this invention, the concave indentation which defines the lens 32 (i.e., the face of the lens 32) is filled with a solid filler 45, such as an epoxy resin or similar polymer, having an acoustic impedance and velocity which are in between those of the ink 35 and the substrate 41. If desired, an anti-reflective coating 46, composed of a $\lambda_z/4$ thick layer of impedance matching material (where $\lambda_z$=the wavelength of the acoustic beam 33 in the coating 46), may be deposited on the lens 32 prior to planarizing it. The planarizing process is, however, essentially the same as was previously described with reference to FIG. 1, so there is no need to repeat that description.

Concentrating on the alternative system configurations which are illustrated in FIGS. 2 and 3, it will be seen that the printhead 31 is not submerged in the ink 35. Instead, it is acoustically coupled to the ink 35 through a transport 36, such as a thin film of mylar, which is advanced in the direction of the arrow 51 (by means not shown) to continuously furnish a fresh supply of ink 35 for the printhead 31. The acoustic coupling of the printhead 31 to the ink 35 may be affected by causing the transport 36 to bear against the planarized upper surface of the subsrate 41 (FIG. 2). Preferably, however, a thin liquid film 52 (FIG. 3) is interposed between the planarized printhead 31 and the transport 36 to faciltate the acoustic coupling into the ink 35. As shown in FIG. 3, the upper surface of the printhead 31 is fully overcoated as at 45. This overcoating 45 suitably is an additional thickness of the planarizing filler material, so it may be deposited on the substrate 41 without requiring any additional processing steps.

CONCLUSION

In view of the foregoing, it will now be understood that the present invention permits concave transducers and lenses to be employed for acoustic printing, even if a planar printhead is needed or desired, such as to simplify the cleaning of the printhead and/or to facilitate the acoustic coupling of the printhead to an ink transport.

What is claimed is:

1. In an acoustic printhead having at least one concave beam forming surface for supplying a converging acoustic beam to eject individual droplets of ink on demand from a pool of ink adjacent an outer surface of said printhead, said printhead and said ink each having a predetermined acoustic impedance and velocity; the improvement comprising a quarter wavelength thick impedance matching layer deposited on said concave surface, and a solid filler material deposited on said impedance matching layer, said filler material being separated from said concave surface by said impedance matching layer and having a generally planar outer surface which is essentially coplanar with the outer surface of said printhead, with said filler material being selected to have an acoustic impedance and an acoustic velocity which are in between the acoustic impedance and velocity, respectively, of said printhead and said ink.

2. The improvement of claim 1 wherein said concave surface is an outer surface of a piezoelectric transducer.

3. The improvement of claim 2 wherein said piezoelectric transducer is spherical.

4. The improvement of claim 1 wherein said concave surface is an acoustic lens defined by an indentation formed in a surface of a substrate having an acoustic velocity which is significantly higher than the acoustic velocity of said ink.

5. The improvement of claim 4 wherein said indentation is spherical and said lens has a F# of approximately 1.

6. The improvement of any one of claims 1-5 wherein said printhead is submerged in said ink.

7. The improvement of claim 6 wherein the outer surface of said filler material is generally flush with a dissimilar material forming the outer surface of said printhead.

8. The improvement of claim 7 wherein said filler material overcoats said printhead and defines its outer surface.

9. The improvement of any one of claims 1-5 wherein said ink is carried by a transport, and the outer surface of said filler material is acoustically coupled to said ink via said transport.

10. The improvement of claim 9 wherein the outer surface of said filler material is generally flush with a dissimilar material forming the outer surface of said printhead.

11. The improvement of claim 10 wherein said filler material overcoats said printhead and defines its outer surface.

* * * * *